US007878052B2

(12) United States Patent
Danby et al.

(10) Patent No.: US 7,878,052 B2
(45) Date of Patent: Feb. 1, 2011

(54) HIGH PRESSURE CAVITATION SYSTEM

(75) Inventors: Susannah Elizabeth Danby, Peterborough (GB); Cathy Youngmi Choi, Metamora, IL (US); Colin Peter Garner, Loughborough (GB); William Elliott Moser, Peoria, IL (US); Drew Douglas Wackerlin, Metamora, IL (US); Timothy Joe Felty, Peoria, IL (US); Nate B. Keller, Morton, IL (US); Benjamin Alexander Reid, Loughborough (GB); Manolis Gavaises, Athens (GR); Emmanouil Giannadakis, Athens (GR); Graham Hargrave, Quorn (GB)

(73) Assignee: Perkins Engines Company Limited, Peterborough (GB)

( * ) Notice: Subject to any disclaimer, the term of this patent is extended or adjusted under 35 U.S.C. 154(b) by 253 days.

(21) Appl. No.: 12/222,039

(22) Filed: Jul. 31, 2008

(65) Prior Publication Data

US 2010/0024537 A1 Feb. 4, 2010

(51) Int. Cl.
*G01M 15/04* (2006.01)

(52) U.S. Cl. ................................ 73/114.49; 73/114.51

(58) Field of Classification Search .............. 73/114.49, 73/114.38, 114.51

See application file for complete search history.

(56) References Cited

U.S. PATENT DOCUMENTS 2,857,759 A * 10/1958 Kiene ...................... 73/114.45
3,511,087 A * 5/1970 Taylor et al. ............ 73/114.38
4,037,467 A * 7/1977 Emerson .................. 73/114.45
4,712,421 A * 12/1987 Young ..................... 73/114.46
4,845,979 A * 7/1989 Farenden et al. ......... 73/114.45
4,990,794 A 2/1991 Ferrari et al.
5,000,043 A 3/1991 Bunch, Jr. et al.
5,017,775 A 5/1991 Granz et al.

(Continued)

FOREIGN PATENT DOCUMENTS

JP 2001-280924 10/2001

(Continued)

OTHER PUBLICATIONS

Su Han Park, Effect of Cavitating Flow on the Flow and Fuel Atomization Characteristics of Biodiesel and Diesel Fuels, American Chemical Society, Oct. 15, 2007, p. 605-613.*

(Continued)

*Primary Examiner*—Freddie Kirkland, III
(74) *Attorney, Agent, or Firm*—Finnegan, Henderson, Farabow, Garrett & Dunner LLP

(57) ABSTRACT

The present disclosure is directed towards a clamping assembly for compressing a plurality of optical plates of a high pressure cavitation system. The clamping assembly may include a mounting frame and a housing coupled to the mounting frame. The clamping assembly may further include a holder distal the housing, the holder having the plurality of optical plates disposed therein. The clamping assembly further including a controllable clamping mechanism operably coupled to a top of the housing, the controllable clamping mechanism applying an axial force to the plurality of optical plate.

20 Claims, 3 Drawing Sheets

U.S. PATENT DOCUMENTS

| | | | | |
|---|---|---|---|---|
| 5,412,981 | A * | 5/1995 | Myers et al. | 73/114.46 |
| 5,783,836 | A | 7/1998 | Liu et al. | |
| 6,234,002 | B1 * | 5/2001 | Sisney et al. | 73/1.57 |
| 6,538,739 | B1 | 3/2003 | Visuri et al. | |
| 6,629,449 | B1 | 10/2003 | Kline-Schoder et al. | |
| 7,057,973 | B2 | 6/2006 | Ferrell | |
| 7,096,724 | B2 * | 8/2006 | Wildman | 73/114.48 |
| 7,197,918 | B2 | 4/2007 | Shen | |
| 7,535,567 | B2 * | 5/2009 | Rebinsky | 356/391 |
| 2008/0215255 | A1 * | 9/2008 | Stockner et al. | 702/34 |
| 2009/0279087 | A1 * | 11/2009 | Cueto | 356/338 |

FOREIGN PATENT DOCUMENTS

| | | |
|---|---|---|
| JP | 2003-57164 | 2/2003 |
| JP | 2007-40724 | 2/2007 |

OTHER PUBLICATIONS

N. Takenaka, Visualization of cavitation phenomena in a Diesel engine fuel injection nozzle by neutron radiography, Nuclear Instruments and Methods in Physics Research, Feb. 24, 2005.*

H. K. Suh, Experimental Investigation of Nozzle Cavitating Flow Characteristics for Diesel and Biodiesel Fuels, International Journal of Automotive Technology, vol. 9, No. 2, Jan. 11, 2008, p. 217-224.*

Bethell et al. "Advanced Nozzle Imaging," Report on Research Project conducted by Loughborough University for Caterpillar Research, Dec. 19, 2002, pp. 1-45.

Haiyun Li et al. "Visualization of Cavitation in High-Pressure Diesel Fuel Injector Orifices," *Atomization and Sprays*, vol. 16, pp. 875-886, (2006).

* cited by examiner

HIGH PRESSURE CAVITATION SYSTEM

TECHNICAL FIELD

The present invention generally relates to a high pressure cavitation system, and more particularly, to a high pressure cavitation system for visualizing a high pressure cavitating fluid.

BACKGROUND

Fuel systems typically employ multiple fuel injectors to deliver injections of high pressure fuel into an engine for combustion. Each fuel injector typically includes a nozzle assembly having a pressurized chamber configured to contain a volume of pressurized fuel. Each injector further includes a needle valve element that is slidably disposed within the pressurized chamber. In response to a deliberate injection requirement, the needle valve element moves to allow the pressurized fuel to flow from the pressurized chamber into a combustion chamber of the engine.

Fuel injectors operate at injection pressures of up to 200 MPa in order to obtain a fine fuel spray for rapid mixing and reduced emissions. Such pressurized fluid systems, however, are susceptible to the phenomenon known as "cavitation." Cavitation generally refers to the formation of vapor bubbles within a fluid stream when, for example, the fluid's operational pressure drops below the fluid's vapor pressure. As applied to a fuel system, cavitation occurs when the speed or velocity of the flowing fuel increases such that the pressure in the system drops below the vapor pressure of the fuel, resulting in local vaporization of the fuel. The local vaporization, in turn, creates a cavity (i.e., hole) or void within the flowing fuel. This low-pressure cavity generally comprises a swirling mass of fuel droplets and vapor bubbles.

Once formed, the low-pressure cavity is generally swept downstream into a region of high pressure, such as, for example, an eddy zone, where it suddenly collapses as the surrounding fluid rushes in to fill the void. As the cavity collapses, each and every vapor bubble within the cavity implodes, releasing a momentary burst of concentrated energy. In instances where a cavity's point of collapse is in contact with a boundary wall, such as, for example, the material surface of the fuel injector nozzle, the concentrated energy released from the bubble implosion locally stresses the wall surface beyond its elastic limit and causes erosion of wall material.

Cavitation can be extremely problematic to the performance of fuel injectors. Specifically, cavitation can affect the mass flow and spray quality characteristics of the fuel injector. Moreover, cavitation can lead to structural damage and a shortened life of the injector. It is, therefore, desirable to experimentally study cavitation structures inside of a fuel injector, and more particularly a fuel injector nozzle, to better understand this economically important flow.

One method of visualizing cavitation in a diesel fuel injector is discussed by Haiyun Li in an article titled "Visualization of Cavitation in High-Pressure Diesel Fuel Injector Orifices," in *Atomization and Sprays,* 2006, 875:886 ("the Li article"). The Li article discloses an apparatus for conducting true-scale, true-pressure visualization of cavitating liquid fuel in a modern diesel fuel injector. Specifically, the Li article discloses an experimental rig consisting of a gaseous nitrogen driver system, a high-pressure flow system, a test section, and a downstream reservoir. The high-pressure flow system includes an intensifier for pressurizing the liquid fuel up to 220 MPa. The intensifier is connected, via a hose, to an optically accessible orifice mount. The orifice mount contains a single acrylic test orifice. The test orifice has a xenon arc lamp on one side as an illumination source, and a camera on the opposing side. In operation, the intensifier pressurizes fuel at a set injection pressure. The fuel then moves from the intensifier to test orifice, where images of both the internal flow and the spray are acquired.

Although the Li article discloses an apparatus for visualizing cavitation at an orifice hole of a fuel injector, the apparatus may not be applicable for studying cavitation inside of a fuel injector nozzle as the apparatus does not include a model of, for example, the nozzle sac of the fuel injector. Furthermore, the apparatus described in the Li article may not have the flexibility to control the duration, frequency, and number of fluid injections into the test section and therefore may not capture cavitation under varying operating conditions.

The present disclosure is directed to improvements in the existing technology.

SUMMARY

One aspect of the present disclosure may be directed towards a clamping assembly for compressing a plurality of optical plates of a high pressure cavitation system. The clamping assembly may include a mounting frame and a housing coupled to the mounting frame. The clamping assembly may further include a holder distal the housing, the holder having the plurality of optical plates disposed therein. The clamping assembly further including a controllable clamping mechanism operably coupled to a top of the housing, the controllable clamping mechanism applying an axial force to the plurality of optical plate.

Another aspect of the present disclosure may be directed towards a test apparatus for a high pressure cavitation system. The test apparatus may include a fuel injector configured to inject pressurized fluid. The test apparatus may further include a plurality of optical plates located downstream the fuel injector for receiving fluid flow from the fuel injector. The test apparatus may also include a fluid reservoir located distal the plurality of optical plates, the fluid reservoir being pressurized to provide back pressure to the test apparatus.

DETAILED DESCRIPTION

Figure 1:
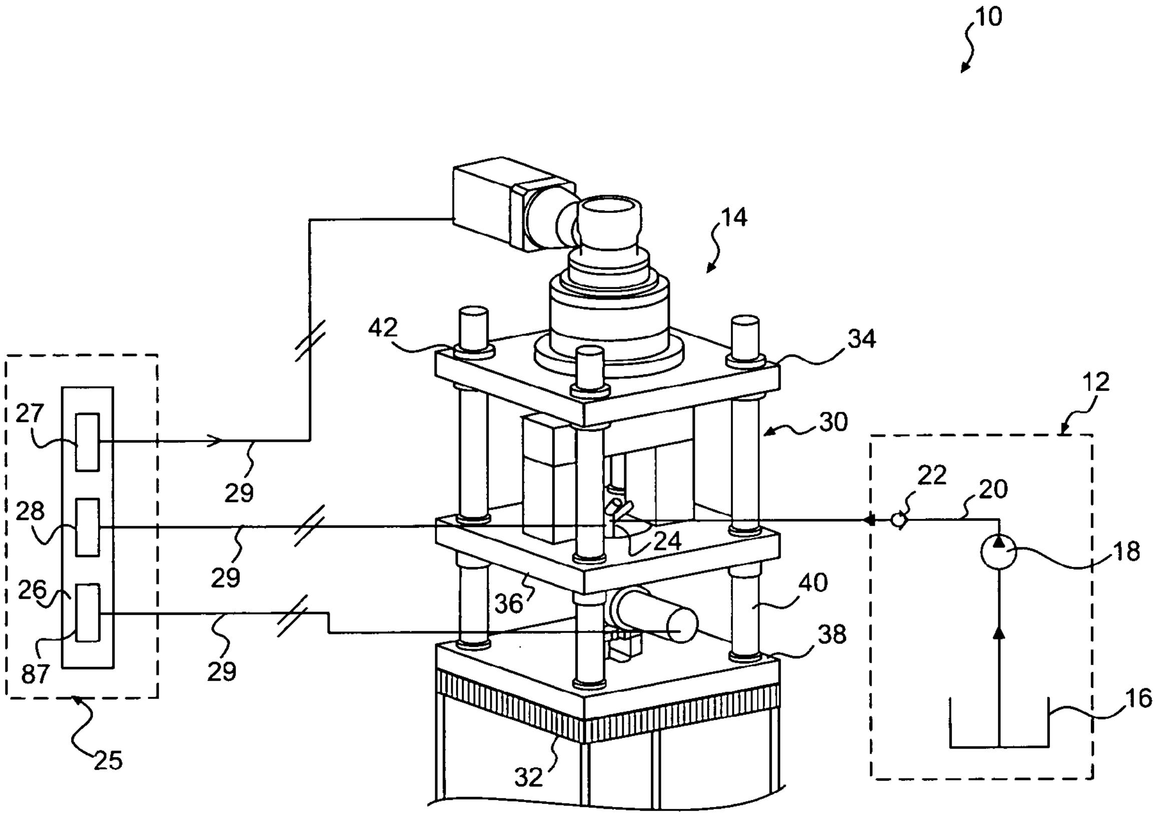
FIG. 1 illustrates a high pressure cavitation system according to the present disclosure.

FIG. 1 illustrates a high pressure cavitation system 10 having a fuel supply system 12 connected to an exemplary test apparatus 14 for visualizing a high pressure cavitating fuel. High pressure cavitation system 10 may further include a control station 25 which may, among other things, control apparatus 14.

Fuel supply system 12 may include a tank 16 configured to hold a supply of low pressure fuel. It will be apparent to those skilled in the art that fluid other than fuel may be used with the high pressure cavitation system 10. Fuel supply system 12 may further include a low pressure pump 18 configured to direct fuel from tank 16 to fuel injector of test apparatus 14. Fuel supply system 12 may also include a fluid supply passage 20 arranged in fluid communication between tank 16 and a fuel injector 24 of test apparatus 14. A check valve 22 may be located in fuel supply passage 20 to provide one directional flow from tank 16 to fuel injector 24 of test apparatus 14.

Test apparatus 14 may include a mounting frame 30 having a base 32 and a plurality of square-shaped horizontal plates parallel to base 32. Specifically, mounting frame 30 may include a top plate 34, a middle plate 36, and a bottom plate 38. A shaft 40 may extend through the each corner of top plate 34, middle plate 36, and bottom plate 38 and may be secured to each of top plate 34, middle plate 36, and bottom plate 38 by a shaft locking collar 42. Bottom plate 38 of mounting frame 30 may be held by base 32.

Figure 2:
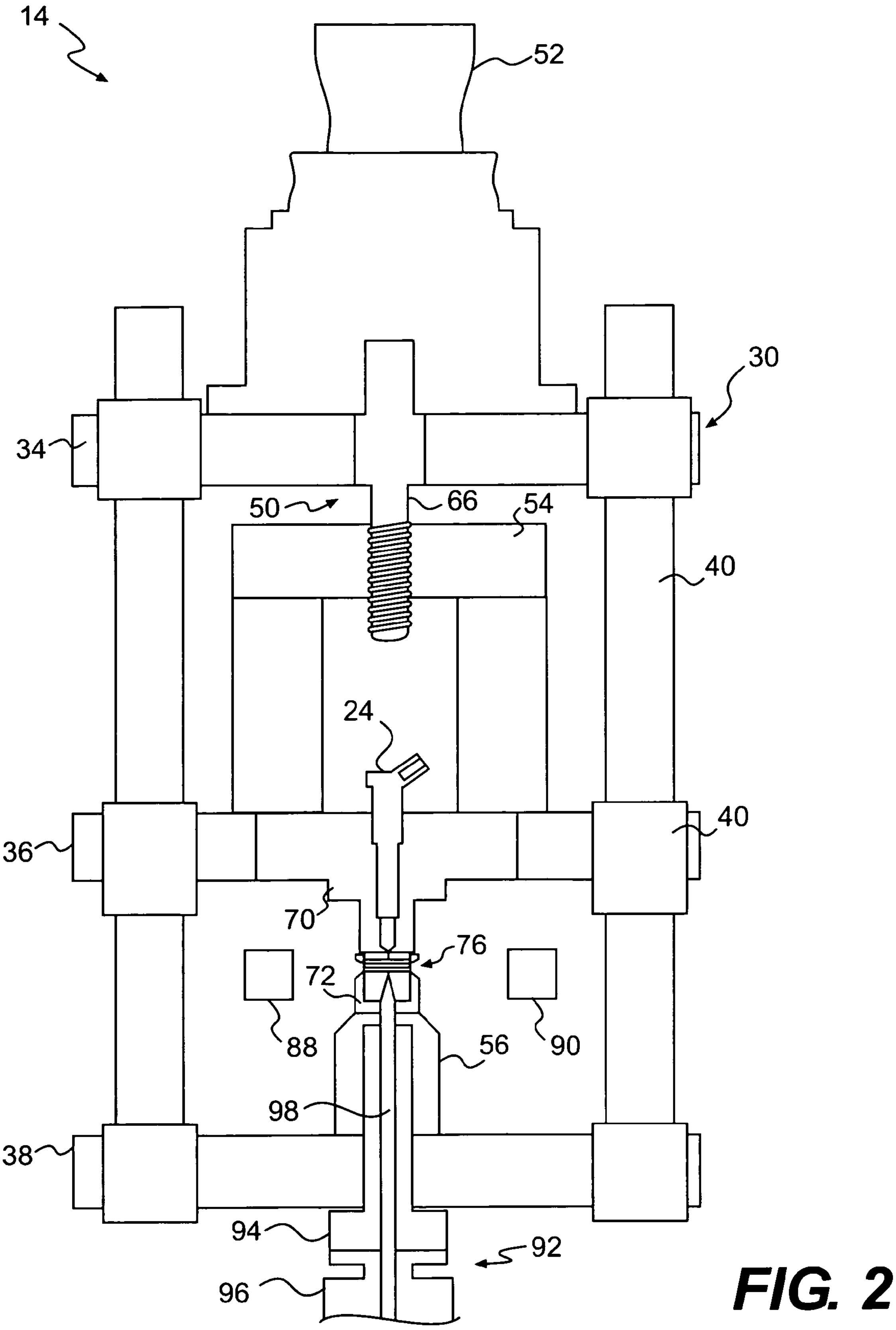
FIG. 2 is cross-sectional illustration the exemplary test apparatus of FIG. 1.

Referring to FIG. 2, test apparatus 14 may include a clamping mechanism 50 including a gearbox and servo motor assembly 52, top clamp 54, and bottom clamp 56. Gearbox and servo motor assembly 52 may be coupled, by way of mounting bolts (not shown), to top plate 34 of mounting frame 30. Gearbox and servomotor assembly 52 may receive a driven member such as, for example, a top portion of clamp screw 66. Clamp screw 66 may extend through a bore in top plate 34. A bottom portion of clamp screw 66 may be threaded and may be received by a bore in top clamp 54. Gearbox and servo motor assembly 52 may be configured to rotate clamp screw 66 to thread clamp screw 66 into top clamp 54. Gearbox and servo motor assembly 52 may, thereby, control the clamping force of top clamp 54 based on the amount of rotation of clamp screw 66. Top clamp 54 may apply an axial force of approximately 100 kN in the downward direction onto middle plate 36.

A housing such as, for example, an injector pod 70 may be mounted to middle plate 36 and extend towards bottom plate 38. A distal portion of injector pod 70 may form a variable gap with a top end of an optical plate holder 72. Optical plate holder 72 may be held by a bottom clamp 56 which may, in turn, be coupled to bottom plate 38 of mounting frame 30. The variable gap between a distal portion of injector pod 70 and a top end of optical plate holder 72 may vary as a function of the axial compressive force applied between top clamp 54 and bottom clamp 56.

Injector pod 70 may be configured to receive fuel injector 24. Fuel injector 24 may be hydraulically, mechanically, or electrically actuated. For example, fuel injector 24 may embody a hydraulically actuated electronically controlled unit injector (HEUI). Fuel injector 24 may be configured to receive low pressure fuel from fuel supply passage 20, increase the pressure of the low pressure fuel, and inject the high pressure fuel into a plurality of optical plates 76 disposed in optical plate holder 72, all in response to a control signal from control station 25. More particularly, actuating fluid may be selectively applied to one side of intensifier piston (not shown) of fuel injector 24 to displace the intensifier piston and pressurize fuel in fuel injector 24 for injection.

Fuel injector 24 may alternatively embody a mechanically actuated electronically controlled unit injector, a common-rail fuel injector, and/or another type of fuel injector known in the art. For example, a high pressure pump and a common rail may be disposed between fuel supply passage 20 and the fuel injector 24. The common rail may be configured to store high pressure fuel. A flow of the pressurized fuel from common rail to fuel injector 24 may be controlled by, for example, an electronically controlled fuel supply regulating valve of fuel injector 24.

Figure 3:
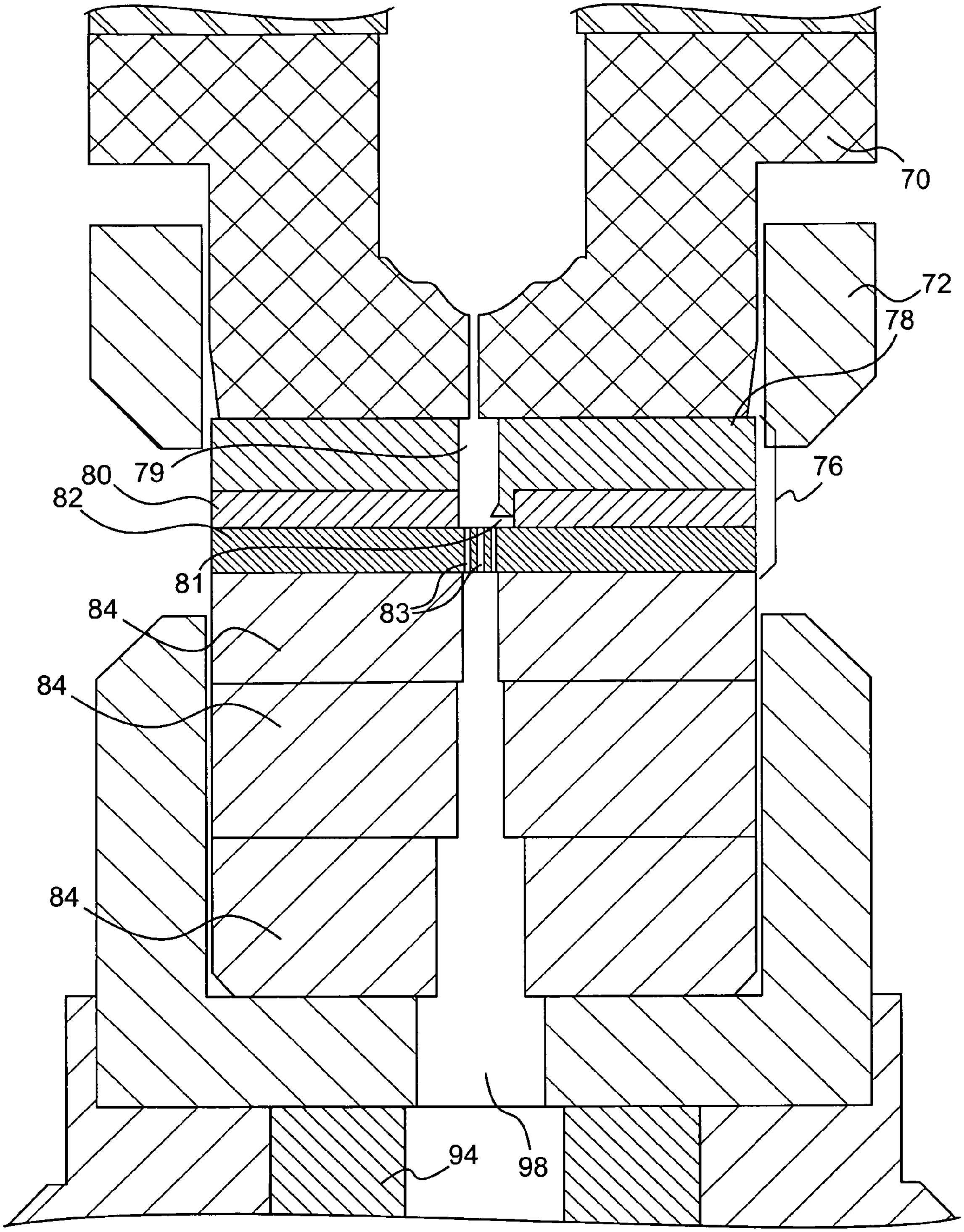
FIG. 3 is a enlarged cross-sectional view of a plurality of optical plates disposed in optical plate holder of FIG. 2.

Fuel injector 24 may be configured to inject fuel up to 200 MPa. Fuel injector 24 may be positioned to inject the high pressure fuel into a plurality of optical plates 76 disposed in optical plate holder 72. Optical plates 76 may be stacked vertically in optical plate holder 72. As shown in FIG. 3 optical plates 76 may include at least one obstruction plate 78, at least one sac plate 80, and at least one multi-hole plate 82.

Optical plates 76 may be configured to model the fuel flow characteristics provided by the internal structure of a fuel injector nozzle. In particular, obstruction plate 78 may be configured to model characteristics inside of the fuel injector nozzle that may obstruct the flow of high pressure fuel. Obstruction plate 78 may include a bore 79 having curvatures that model the curvatures inside of a fuel injector nozzle. Curvatures of bore 79 may be configured to induce dynamic cavitation during high pressure fuel flow. Sac plate 80 may be placed distal obstruction plate 78 and may be configured to model the sac in the tip of a fuel injector nozzle. Sac plate 80 may include a cavity 81 having a volume that corresponds to the volume of the sac in the tip of a fuel injector nozzle. Multi-hole plate 82 may be placed distal to sac plate 80 and may be configured to model a plurality of orifices disposed along an outer boundary of a fuel injector nozzle. Multi-hole plate 82 may include a plurality of micro-holes 83. For example, multi-hole plate 82 may have at least three micro-holes 83 disposed along the length of multi-hole plate. Micro-holes 83 of multi-hole plate 82 may be configured to induce string cavitation during high pressure fuel flow. Bore 79 of obstruction plate 78, cavity 81 of sac plate 80, and at least one micro-hole 83 of multi-hole plate 82 may be aligned to allow high pressure fuel flow therethrough. Support plates 84 or plates may be placed distal multi-hole plate 82. Support plates 84 may allow fuel flow to a distal portion of test apparatus 14.

Referring back to FIG. 2, test apparatus 14 may further include a laser 88 and camera 90. Laser 88 may be disposed on one side of optical plates 76 and may be configured to illuminate optical plates 76 during operation of test apparatus 14. Camera 90 may be located on the opposing side of optical plates 76. Camera 90 may be configured to capture images of the flow of high pressure fuel through optical plates 76.

Fluid reservoir assembly 92 may extend from bottom plate 38, and may include a fluid reservoir adapter 94 and a fluid reservoir 96. Fluid reservoir adapter 94 may be configured to couple fluid reservoir 96 to test apparatus 14. A passageway 98 may be arranged in fluid communication between optical plates 76 and fluid reservoir 96 of fluid reservoir assembly 92. Passageway 98 may extend through a bore in optical plate holder 72, bottom clamp 56, bottom plate 38, and fluid reservoir adapter 94.

Fluid reservoir 96 may be configured to receive the high pressure fuel from optical plates 76. In one embodiment fluid reservoir 96 may include a rate tube configured to measure an instantaneous flow rate of the high pressure fuel as the fuel exists optical plates 76. In an alternative embodiment, fluid reservoir 96 may include a pressure vessel. Pressure vessel may include a volume of pressurized nitrogen to control the back pressure of test apparatus 14. Pressure vessel may be used to control the pressure gradient across optical plates 76, and thereby control characteristics of fuel flow therein.

Referring back to FIG. 1, control station 25 of high pressure cavitation system 10 may include an electronic control unit (ECU) 26. ECU 26 may include a clamping controller 27, a fuel injector controller 28, and a imaging device controller 87.

Clamping controller 27 may control clamping mechanism 50 to apply a compressive force of approximately 100 kN to optical plates 76 disposed in optical plate holder 72. Specifically, clamping controller 27 may provide a control signal via communication links 29 to gearbox and servo motor assembly 52. In response to the control signal, gearbox and servomotor assembly 52 may rotate clamp screw 66 to thread clamp screw into top clamp 54, in order to increase the clamping force of top clamp 54 onto injector pod 70.

Fuel injector controller 28 may be configured to control fuel injector 24. For example, fuel injector controller 28 may be configured run fuel injector in one of a steady state operation and transient state operation. A steady state operation in this context may be interpreted as a state in which the time interval between each injection event does not change substantially over a particular period of time. A transient operation may be interpreted as a state in which the time interval between each injection event may change over time.

Fuel injector controller 28 may be further configured to determine at least one injection parameter of a fuel injector 24 injection event. Injection parameters may include: the number of separate injections during each injection event, the time duration of each injection, the pressure of fuel associated with each injection, the injection timing, and any combination of the above injection parameters during an injection event. In one embodiment, an operator may control the injection parameters of fuel injector 24 with the aid of ECU 26.

Imaging device controller 87 may communicate with at least one of laser 88 and camera 90. Imaging device controller 27 may, for example, communicate with camera 90 to capture images of high pressure fuel flow through optical plates 76.

INDUSTRIAL APPLICABILITY

The disclosed system may be used to study cavitation in a real-sized fuel injector nozzle. In particular, the disclosed system may be used to visualize flow characteristics of high pressure fuel inside of a plurality of compressed optical plates that model the fuel flow characteristics provided by the internal structure of a fuel injector nozzle. The captured images may be used to validate cavitation simulation code. Operation of the high pressure cavitation system will now be described.

To begin, ECU 26 may control clamping mechanism 50 to apply a compressive force of approximately 100 kN to optical plates 76 disposed in optical plate holder 72. Specifically, ECU 26 may provide a control signal via communication links 29 to gearbox and servo motor assembly 52. In response to the control signal, gearbox and servo motor assembly 52 may rotate clamp screw 66 within top clamp 54 to move top clamp 54 and increase the clamping force between top clamp 54 and bottom clamp 56. Top clamp 54 may apply approximately a 100 kN vertical compressive force to injector pod 70 and optical plates 76. The compressive force may be applied in a downward direction. In this way, top clamp 54 and bottom clamp 56 may uniformly compress optical plates 76 disposed in optical plate holder 72 to prevent pressurized fuel from leaking between optical plates 76. It is appreciated that clamping mechanism 50 is sized and aligned not to distort optical plates 76 in optical plate holder 72.

In operation, fuel supply system 12 may direct low pressure fuel to fuel injector 24 of test apparatus 14. Specifically, low pressure pump 18 may pump fuel from tank 16 to fuel injector 24 of test apparatus 14 via fuel supply passage 20. Fuel injector 24 may receive the supply of low pressure fuel. ECU 26 may provide a control signal via communication links 29 to fuel injector 24 to pressurize the low pressure fuel in a manner known to one skilled in the art. ECU 26 may also provide a control signal to fuel injector 24 to initiate an injection event to inject the high pressure fuel into optical plates 76.

ECU 26 may be configured to determine at least one injection parameter of the injection event. As noted above, the at least one injection parameter of the injection event may be defined as one of the number of separate injections during each injection event, the time duration of each injection, the pressure of fuel associated with each injection, and the injection timing. In operation, ECU 26 may determine the at least one injection parameter and run fuel injector 24 in one of a steady state and transient state operation so that fuel injector 24 may inject the high pressure fuel into the plurality of optical plates 76 in accordance with the at least one injection parameter. Optical plates 76 may include at least one obstruction plate 78, at least one sac plate 80, and at least one multi-hole plate 82.

High pressure fuel may flow through bore 79 of obstruction plate 78. Bore 79 may have curvatures that model the curvatures inside of a fuel injector nozzle. Curvatures of bore 79 may be configured to induce dynamic cavitation during high pressure fuel flow. Sac plate 80 of optical plates 76 may placed distal to obstruction plate 78 and may be configured to model the sac in the tip of a fuel injector nozzle. As fuel exists bore 79 of obstruction plate 78, the high pressure cavitating fuel may enter cavity 81 of sac plate 80. High pressure fuel may flow from sac plate 80 into at least one micro-hole 83 of multi-hole plate 82. Micro-holes 83 of multi-hole plate 82 may model orifices disposed on the outer boundary of a fuel injector nozzle and may be configured to induce string cavitation as high pressure fuel passes therethrough. As high pressure fuel passes through optical plates 76, camera 90 may capture images of the cavitation structures inside optical plates 76.

High pressure fuel may exist optical plates 76 and move downwardly into fluid reservoir 96. Fluid reservoir 96 may be configured to collect the high pressure fuel, thereby allowing a plurality of injections to occur. In one embodiment fluid reservoir 96 may be a rate tube. The rate tube may be configured to measure the instantaneous rate of high pressure fuel flow. Fluid reservoir 96 may alternatively be a pressure vessel. Pressure vessel may be configured to control the back pressure of test apparatus 14 in addition to receiving the high pressure fuel. More specifically, pressure vessel may be set to a predetermined pressure to provide a pressure gradient across optical plates 76 and effect characteristics of fuel flow therein. The pressure vessel may further model pressures found a combustion chamber located downstream of a fuel injector in an engine.

The disclosed high pressure cavitation system 10 may have the flexibility to study cavitation under a range of operating conditions. Specifically, images of high pressure fuel flow may be taken during steady state operation and may capture the formation and collapse of cavitation structures inside of the fuel injector nozzle. Images of high pressure fuel flow may be taken during transient state or steady state injection cycles. High pressure cavitation system 10 may additionally be used to study the link between a variety of injection parameters such as, for example, time duration of each injection, the pressure of fuel associated with each injection, the injection timing, and cavitation. Images acquired with high pressure cavitation system 10 may be used to validate cavitation simulation code which, in turn, may be used when designing fuel injectors.

It will be apparent to those skilled in the art that various modifications and variations can be made to the high pressure cavitation system of the present disclosure. Other embodiments of the high pressure cavitation system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A clamping assembly for compressing a plurality of optical plates of a high pressure cavitation system, comprising:
- a mounting frame;
- a housing coupled to the mounting frame;
- a holder distal the housing, the holder having the plurality of optical plates disposed therein; and
- a controllable clamping mechanism operably coupled to a top of the housing, wherein the controllable clamping mechanism includes a first clamp coupled to the housing and a second clamp coupled to a bottom of the holder, the controllable clamping mechanism applying an axial force to the plurality of optical plates.

2. The clamping assembly of claim 1, wherein the housing includes a bore for receiving the fuel injector.

3. The clamping assembly of claim 1, wherein the plurality of optical plates includes:
- at least one sac plate configured to model a portion of a fluid cavity in a fuel injector nozzle;
- at least one obstruction plate configured to model characteristics inside of the fuel injector nozzle that obstruct a flow of fluid; and
- at least one multi-hole plate having a plurality of micro-holes configured to model a plurality of orifices disposed along an outer boundary of the fuel injector nozzle.

4. The clamping assembly of claim 1, further including a servo motor and gearbox assembly connected to the first clamp.

5. The clamping assembly of claim 4, wherein the servo motor and gearbox assembly is configured to threadably engage a driven member with the first clamp to control the axial force applied to the optical plates.

6. The clamping assembly of claim 1, further including a variable gap between the housing and the holder, the gap varying as a function of the axial force.

7. The clamping assembly of claim 1, wherein each of the plurality of optical plates includes a fluid flow path that is shaped to simulate fluid flow inside a fuel injector.

8. A test apparatus for a high pressure cavitation system, the test apparatus comprising:
- a fuel injector configured to inject pressurized fluid; and
- a plurality of optical plates located downstream of the fuel injector for receiving fluid flow from the fuel injector, the plurality of optical plates including:
  - at least one sac plate configured to model a portion of a fluid cavity in a fuel injector nozzle;
  - at least one obstruction plate configured to model characteristics inside of the fuel injector nozzle that obstruct the flow of the pressurized fluid; and
  - at least one multi-hole plate having a plurality of micro-holes configured to model a plurality of orifices disposed along an outer boundary of the fuel injector nozzle.

9. The test apparatus of claim 8, further including a fluid reservoir located distal the plurality of optical plates, the fluid reservoir being pressurized to provide back pressure to the test apparatus.

10. The test apparatus of claim 9, wherein the fluid reservoir is a nitrogen vessel and the nitrogen vessel having a volume of pressurized nitrogen.

11. The test apparatus of claim 8, further including a clamping mechanism applying an axial force to the plurality of optical plates to compress the plurality of optical plates.

12. The test apparatus of claim 8, wherein the fuel injector is configured to receive a supply of a low pressure fluid and pressurize the fluid for injection.

13. The test apparatus of claim 12, wherein the fuel injector is configured to inject at pressures of approximately 200 MPa.

14. A high pressure cavitation system, comprising:
- a supply of fluid;
- an apparatus including:
  - a mounting frame;
  - a fuel injector disposed within the mounting frame to receive the supply of fluid and inject the supply of fluid;
  - a plurality of optical plates in fluid communication with the fuel injector, wherein each of the plurality of optical plates includes a differently shaped fluid flow path, and wherein at least one optical plate of the plurality of optical plates includes a plurality of micro-holes configured to model a plurality of orifices of the fuel injector; and
- a controller in communication with the fuel injector of the apparatus, the controller being configured to operate the fuel injector to vary at least one injection parameter.

15. The high pressure cavitation system of claim 14, wherein the controller is further configured to operate the fuel injector in one of a steady state operation and a transient state operation.

16. The high pressure cavitation system of claim 14, wherein the at least one injection parameter includes at least one of an injection timing, an injection shot mode, and an injection quantity.

17. The high pressure cavitation system of claim 14, wherein the plurality of optical plates includes:
- at least one sac plate configured to model a portion of a fluid cavity in an fuel injector nozzle;
- at least one obstruction plate configured to model characteristics inside of the fuel injector nozzle that obstruct a flow of the high pressure fluid; and
- at least one multi-hole plate having the plurality of micro-holes.

18. The high pressure cavitation system of claim 17, further including a camera to capture the flow of the high pressure fluid through the plurality of optical plates.

19. The high pressure cavitation system of claim 14, further including a pressure vessel configured to control the back pressure of the apparatus.

20. The high pressure cavitation system of claim 14, further including a rate tube located downstream of the plurality of optical plates and configured to measure an instantaneous flow rate of the high pressure fluid.

* * * * *